United States Patent [19]
Schäfer

[11] Patent Number: 5,918,864
[45] Date of Patent: Jul. 6, 1999

[54] HYDRAULICALLY DAMPING ELASTIC BEARING

[76] Inventor: Christof Schäfer, Ahrentaler Strasse 11, Sinzig, Germany, D-53489

[21] Appl. No.: 08/826,562

[22] Filed: Apr. 4, 1997

[30] Foreign Application Priority Data

Apr. 6, 1996 [DE] Germany ............... 196 13 912

[51] Int. Cl.[6] .................................... F16F 13/14
[52] U.S. Cl. ................. 267/140.12; 267/140.3; 267/219; 267/140.2
[58] Field of Search .......... 267/140.12, 140.11, 267/140.13, 140.15, 140.3, 219, 220, 35, 140.2, 140.4, 141.2, 141.7, 141.6, 141.5, 141.4, 141.3, 139, 140, 136; 248/562, 636, 638, 634; 180/902, 300, 312

[56] References Cited

U.S. PATENT DOCUMENTS

| | | | |
|---|---|---|---|
| 4,667,942 | 5/1987 | Bitschkus et al. | 267/140.12 |
| 4,749,174 | 6/1988 | Kanda | 267/140.12 |
| 4,871,152 | 10/1989 | Funahashi | 267/140.12 |
| 4,958,811 | 9/1990 | Brenner et al. | 267/219 |
| 4,971,456 | 11/1990 | Hori | 267/219 |
| 5,060,918 | 10/1991 | Kanda | 267/219 |
| 5,181,698 | 1/1993 | Fiene et al. | 267/140.12 |
| 5,188,346 | 2/1993 | Hamada et al. | 267/140.12 |
| 5,299,788 | 4/1994 | Kanda | 267/140.12 |
| 5,375,821 | 12/1994 | Toshimitsu et al. | 267/140.12 |
| 5,489,086 | 2/1996 | Kanda | 267/140.12 |
| 5,531,426 | 7/1996 | Brühl | 267/140.12 |
| 5,725,202 | 3/1998 | Nakamura et al. | 267/140.12 |
| 5,735,511 | 4/1998 | Stocker et al. | 267/140.13 |

*Primary Examiner*—Douglas C. Butler
*Attorney, Agent, or Firm*—Niles H. Ljungman and Associates

[57] ABSTRACT

A hydraulically damping elastic bearing including an inner tube, an outer tube that is placed concentrically or eccentrically apart from the inner tube, and a rubber part inserted in between the inner tube and the outer tube. In the rubber part at least one chamber, filled with damping agents, is placed. Within the chamber at least one elastic end stop body is provided, which end stop body is, if necessary, surrounded with an element that has a greater strength than the end stop body.

16 Claims, 3 Drawing Sheets

HYDRAULICALLY DAMPING ELASTIC BEARING

BACKGROUND OF THE INVENTION

1. Field of the Invention

The present invention relates generally to a hydraulically damping rubber or elastic bearing, composed of an inner tube, an outer tube placed concentrically or eccentrically apart from the inner tube, a rubber or elastic part inserted in between the inner tube and outer tube and at least one chamber, filled with damping agents, placed in the rubber or elastic part.

2. Background Information

Rubber bearings are generally known (e.g., German Patent No. 27 55 117) which consist of an outer bearing bush and an inner part that is held in the inside by an elastomer body, whereby the elastomer body shows, above and below the inner part, clearances as spring space. The possibility of utilizing damping agents for hydraulic damping is not planned with this embodiment. The metallic inner part is equipped with a recess that extends in the longitudinal direction at one of the outsides bordering the clearances, in which recess an elastic end stop body is inserted.

Furthermore, hydraulically damping rubber bearings are generally known (e.g., German Patent No. 38 18 287 corresponding to U.S. Pat. No. 4,958,811) where end stop bodies are provided for outside the chamber filled with damping agents. These end stop bodies require corresponding space which is not available in every fitting situation so that in such cases different constructional solutions have to be used.

OBJECT OF THE INVENTION

The object of the present invention is to create a hydraulically damping rubber or elastic bearing where end stop bodies are provided to not only meet the path limitation necessary for durability but to also allow, through the design of the end stop body, a variation of the end stop body's characteristic curve (hardness, progression, preload).

SUMMARY OF THE INVENTION

The present invention teaches that this object can be accomplished in accordance with at least one preferred embodiment, by an arrangement in which at least one elastic end stop body is preferably provided within the chamber. The end stop body can be placed radially, extending between the inner tube and the outer tube, and can be tightly connected to the inner tube or outer tube.

In accordance with a preferred embodiment, the end stop body is preferably surrounded with an element which shows a greater strength than the end stop body. Here it is beneficial that such a hydraulically damping rubber or elastic bearing can absorb high radial forces in a durable manner. Through the element, the free rubber surface of the end stop body is reduced so the end stop body can harden correspondingly together with the element.

In other words, and in accordance with an embodiment of the present invention, the end stop body can be surrounded by an element having a higher rigidity than the end stop body. The element surrounding the end stop body can reduce the exposed surfaces of the end stop body and can correspondingly limit the deformation of the end stop body. The above mentioned embodiment can allow the rubber or elastic bearing of the present invention to absorb high radial forces in a durable manner.

According to another embodiment, the element can surround the sidewalls of the end stop body.

Further, it is preferable that the element surround the sidewalls and the end face of the end stop body.

Through the design of the element and the end stop body, the characteristic curve can be adjusted in many different ways to meet the respective requirements. About this, it is planned that between the element and the end stop body in the surface of the element and/or the end stop body at least one channel is placed which channel is connected to the chamber. This channel has the further advantage that damping agents can stream from the chamber into this channel and thus counteract to any possible generation of noise.

In other words, and in accordance with an embodiment of the present invention, the design and configuration of the element and end stop body can be changed to adjust the characteristic curve of the end stop body to meet the particular requirements of the rubber or elastic bearing. A channel can be disposed between the end stop body and the element to permit the flow of damping agents from the chamber to the area or space between the end stop body and the element to reduce any noise generated by the element and the end stop body and to possibly affect the characteristic curve of the end stop body.

Another additional damping possibility is created, pursuant to a preferred feature, in such a way that between the end face of the element and the inner tube or outer tube that the end face of the element is turned to, at least one radially or rotatingly extending knob is provided. This knob can be apart from its neighboring area of the respective tube, but can also be placed so that there is a permanent contact between the neighboring wall and the knob, whereby this knob will also be deformed through a corresponding deformation of the rubber bearing. It is easily conceivable that a large number of knobs can be spread on the end face of the end stop body. These knobs also secure the force fit of the element on the end stop body.

Another affect on the end stop body's characteristic curve exists in that between the element and the bottom area of the end stop body, at least some parts of the end stop body are exposed. In this area, the end stop body allows an elastic deformation in a favorable manner so that not only pull and push motions can be cushioned but also torsional stress.

In other words, and in accordance with an embodiment of the present invention, a portion of the end stop body, near the end stop body's connection to the inner tube or outer tube, is preferably not covered by the element. The area of the end stop body not covered by the element can be deformed in an advantageous manner to dampen both pull and push motions as well as torsional stress. The area of the end stop body not covered by the element and thus allowed to deform can then preferably have an effect on the characteristic curve of the end stop body.

Another possibility of effecting the end stop body's characteristic curve with regard to the progression or the preload is planned in that the end stop body fills the element only partially. This means that the elastic material of the end stop body does not fill in, e.g., the corners of the element, so that recesses are arranged in such a geometrical manner that with pull and push stress, a deformation of the end stop body's material can take place into these recesses.

In other words, and in accordance with one embodiment, the elastic material of the end stop body should not completely fill in the element. The open areas between the element and the end stop body can be arranged in a pattern to allow the elastic material of the end stop body to be deformed into the open areas upon the application of stress to the rubber or elastic bearing. By allowing the end stop body to deform into the open areas of the element, the characteristic curve of the end stop body can be changed with regard to progression or preload.

Pursuant to another preferred embodiment, the element is made of plastic or a similar material. It is beneficial that metal armors of the end stop body as well as the element, depending on the requirement and adjustment of the entire rubber or elastic bearing, can also be designed.

The above discussed embodiments of the present invention will be described further hereinbelow with reference to the accompanying figures. When the word "invention" is used in this specification, the word "invention" includes "inventions", that is, the plural of "invention". By stating "invention", the Applicant does not in any way admit that the present application does not include more than one patentably and non-obviously distinct invention, and maintains that this application may include more than one patentably and non-obviously distinct invention. The Applicant hereby asserts that the disclosure of this application may include more than one invention, and, in the event that there is more than one invention, that these inventions may be patentable and non-obvious one with respect to the other.

BRIEF DESCRIPTION OF THE DRAWINGS

The present invention is explained in greater detail below, with reference to the embodiments illustrated in the accompanying drawings, wherein.

DESCRIPTION OF THE PREFERRED EMBODIMENT

Figure 1:
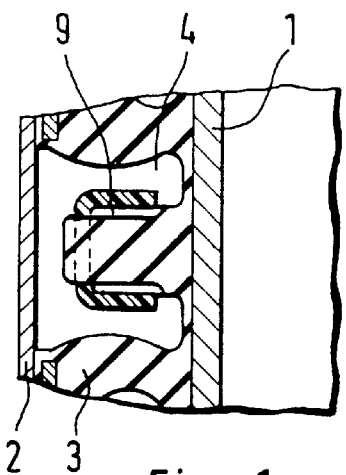
FIGS. 1 and 2 illustrate a hydraulically damping rubber bearing in a sectional view, with an end stop body and an element with a boundary on the side.

The hydraulically damping rubber or elastic bearing illustrated in FIG. 1 can include an inner tube 1, and an outer tube 2. The outer tube 2 is preferably placed concentrically apart from the inner tube 1. A rubber or elastic part 3 is preferably inserted in between the inner tube 1 and the outer tube 2. The rubber or elastic part 3 can have a chamber 4 filled with damping agents. The chambers 4, filled with damping agents, can be hydraulically connected to one another. The rubber or elastic part 3 can be tightly connected to the inner tube 1 as well as to the outer tube 2.

In another possible embodiment of the present invention several chambers 4 can be disposed in the rubber or elastic part 3 between the inner tube 1 and the outer tube 2. The chambers 4 can be arranged in a symmetrical or an asymmetrical pattern inside the rubber or elastic part 3. The chambers 4 can all be a uniform size or shape, but they can also be in various sizes or shapes. The rubber or elastic part 3 can also include a passageway or channel 21 (see FIG. 7A) to hydraulically connect the chambers 4 to permit flow of a damping medium between the chambers 4.

Figure 2:
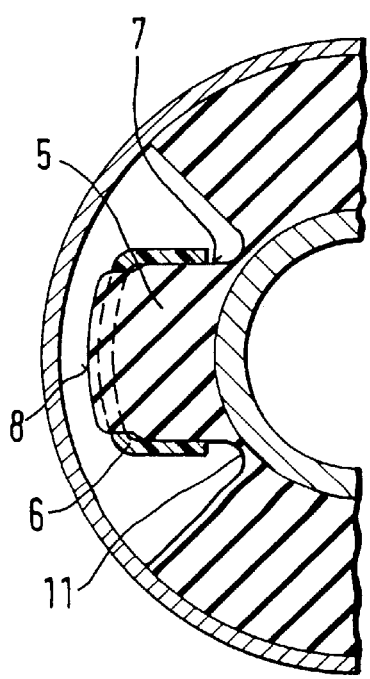

The hydraulically damping rubber or elastic bearing, illustrated in FIGS. 1 and 2, shows in the chamber 4 an end stop body 5, whose sidewalls 7 are preferably surrounded by an element 6.

In another possible embodiment of the present invention, the end stop body 5 can be mounted on the inner tube 1 and can extend toward the outer tube 2. The end stop body 5, at its end closer to the outer tube 2, can include an end face 8. The end face 8 can preferably contact the outer tube 2 upon the application of stress to the rubber or elastic bearing. The end stop body 5 can be designed to have several different shapes to ensure the proper characteristic curve for the hydraulically damping rubber or elastic bearing. The end stop body 5 can be substantially block or prism shaped. The dimensions of the end stop body 5 can be based upon the size of the chamber 4.

In still another possible embodiment of the present invention there can be more than one end stop body 5 mounted within a chamber 4. The end stop bodies 5 can be arranged symmetrically or asymmetrically within the chamber 4. The end stop bodies 5 can be of a uniform size and shape or each end stop body 5 can be of a different size and shape.

The element 6 can reduce the free surface of the end stop body 5 in the case of stress so that the end stop body 5 will preferably be hardened or possibly reinforced. Through the design of the element 6 and the end stop body 5, the characteristic curve of the end stop body 5 can be adjusted in many different ways, with regard to its hardness, progression as well as its preload, to meet corresponding requirements of the hydraulically damping rubber or elastic bearing. At the same time, the end stop body 5 can facilitate the radial path limitation of the outer tube 2 vis-a-vis the inner tube 1. Such rubber or elastic bearings are preferably installed in the undercarriages of running gears in automobiles. Through the design of the chambers 4 filled with damping agents, movements in the direction of the chambers 4 can be dampened.

In another possible embodiment of the present invention, a series of recesses 22 (see FIG. 8A) can be arranged between the end stop body 5 and the element 6. The recesses 22 can be used to adjust the characteristic curve of the end stop body 5 by allowing portions of the end stop body 5 to deform into the recesses 22 upon the application of stress to the rubber or elastic bearing. The recesses 22 can be arranged in many possible patterns different from the pattern illustrated in FIG. 8A to achieve the desired characteristic curve for the end stop body 5.

Figure 3:
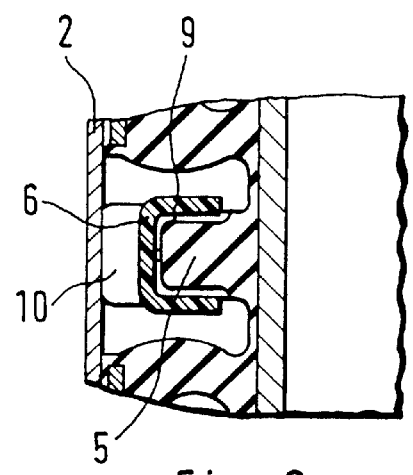
FIGS. 3 and 4 illustrate a rubber bearing where the end stop body is equipped with an additional knob.
Figure 4:
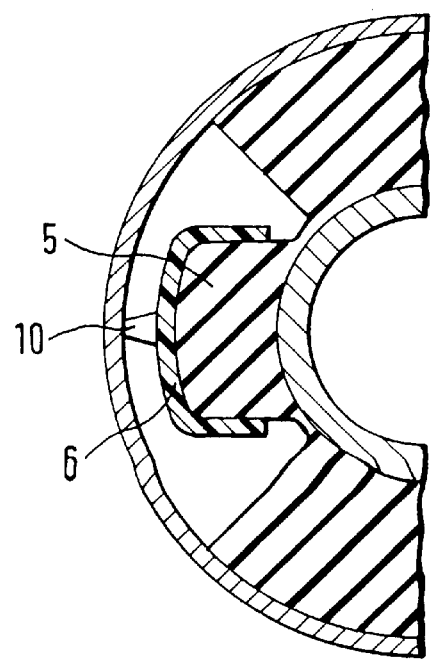

In the embodiments illustrated in FIGS. 3 and 4, a hydraulically damping rubber or elastic bearing can be gathered, where the end stop body 5 can be surrounded with an element 6, whereby between the element 6 and the outer tube 2 can be a knob 10. The knob 10 can be mobilized to generate additional damping forces, and to ensure the force fit of the element 6 on the end stop body 5. The knob 10 can also be designed to be twistable by 90 degrees in the direction illustrated. A knob 10 rotating around the element 6 can also be possible. In the cross direction the knob 10 can be interrupted, thus ensuring that the damping agent within the chamber 4 (see lower part of the drawing, FIGS. 3 and 4) can exchange damping agents. On the one hand, a channel 9 can serve to put damping agents between the element 6 and the end stop body 5, e.g., in order to avoid or reduce the generation of noise, and, on the other hand, the channel 9 can serve the additional purpose in that more selected elasticities can be designed.

In other words, and in accordance with one possible embodiment of the present invention, the knob, projection or knob 10 can be oriented radially or lengthwise between the outer tube 2 and the element 6. The knob or projection 10 could also be oriented 90 degrees from the position described immediately above into a position where the projection or knob 10 can extend circumferentially along the outer edge of the element 6. The knob or projection 10 could also have openings or passageways to allow for a flow of damping medium throughout the chamber 4 in any situation. The knob or projection 10 could be solid member, but could also be a ring shaped, cylindrical or tubular member. The knob or projection 10 could also be configured to withstand some angular movement of the element 6 relative to the outer tube 2 and still remain in position between the element 6 and the outer tube 2.

Figure 5:
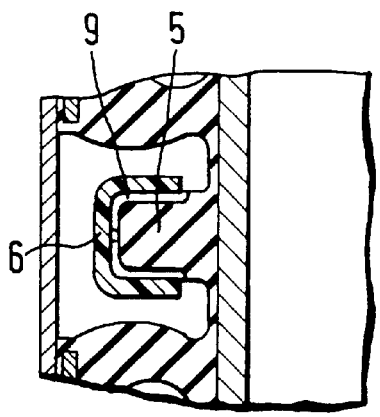
FIGS. 5 and 6 illustrate a rubber bearing with the element acting as a boundary on the front side and side.
Figure 6:
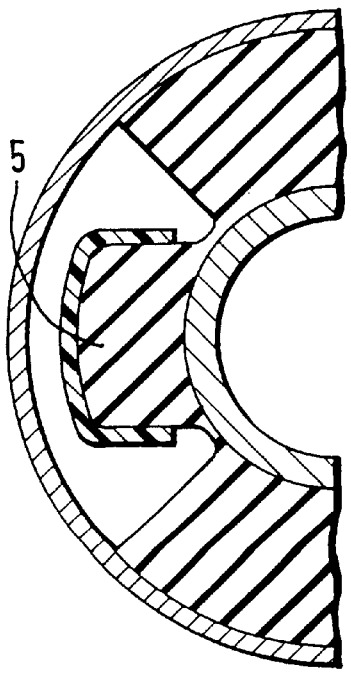

In the embodiments illustrated in FIGS. 5 and 6 an end stop body 5 made entirely of elastic material can be gathered; further, the element 6 can be equipped with a channel 9.

Figure 7:
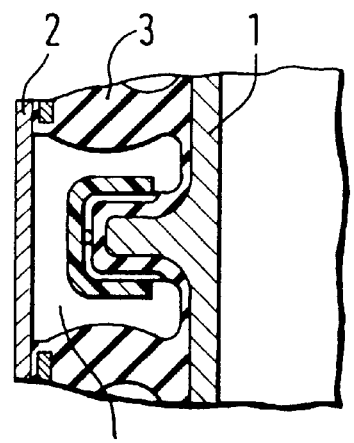
FIGS. 7 and 8 illustrate a rubber bearing where the end stop body shows a metal support.
Figure 8:
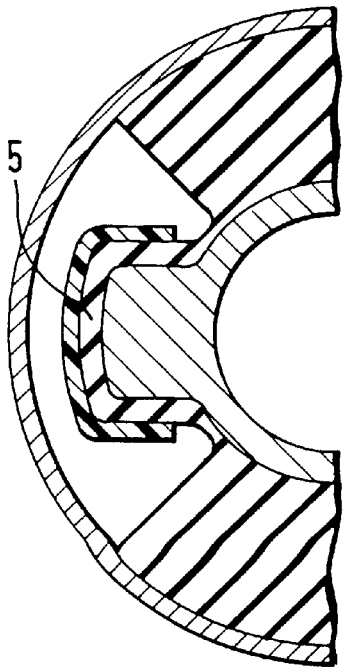
Figure 7A:
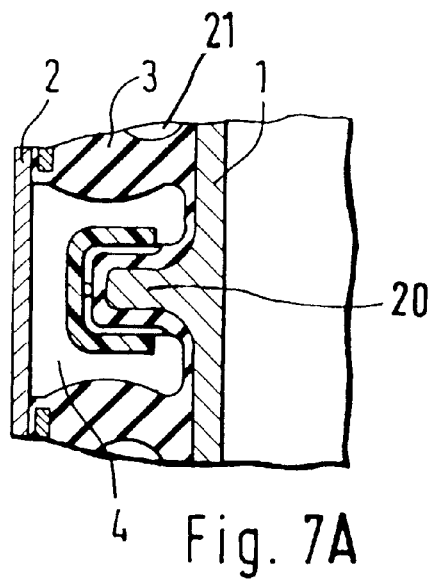
FIGS. 7A and 8A illustrate additional features of the rubber bearing of FIGS. 7 and 8.
Figure 8A:
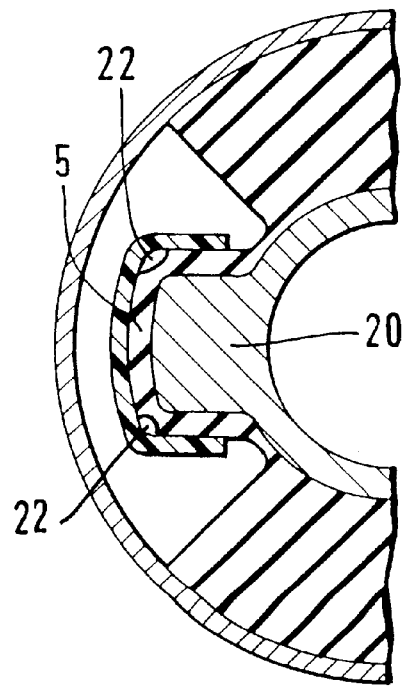

In the embodiments illustrated in FIGS. 7 and 8, an end stop body 5 can be gathered, which end stop body 5 can include a metal support 20 in its inner area. The inner tube 1 can have a corresponding area that can extend outwardly in a radial manner.

In another possible embodiment of the present invention, the inner tube 1 can have a portion or portions which project radially toward the outer tube 2. The projection of the inner tube 1 can serve as a metal support 20 (see FIG. 7A or BA) for the end stop body 5. The end stop body 5 can then be mounted on and supported by the projection 20 of the inner tube 1. The combination of the projection 20 and the end stop body 5 can be used to change the characteristic curve of the end stop body 5.

The respective bottom area 11, where the surface of the end stop body 5 is exposed vis-a-vis the element 6, can serve the purpose in that in this area deformations/torsions can be designed in the case of torsional strain or cardanic strain. Depending on the free space between the element 6 and the bottom area 11 of the end stop body 5, variations in the characteristic curve of the entire rubber bearing can be developed through this area.

In another possible embodiment of the present invention, the rubber or elastic part 3 and the end stop body 5 can be made of a resilient material, an elastic material, an elastomer or possibly a rubber or neoprene type material. The resilient or elastic material used for the rubber or elastic part 3 and the end stop body 5 should be able to dampen vibrations and should be able to contain a damping medium without a breaking down of the resilient or elastic material. The resilient or elastic material should also be oil resistant. Further, the rubber or elastic part 3 and the end stop body 5 can be rigidly attached to the inner tube and/or outer tube by vulcanization or any similar process.

In another preferred embodiment of the present invention, the inner tube 1 can be mounted on a shaft or bolt (not shown) and the outer tube 2 can have mountings for attachment to a component of a motor vehicle (not shown). The rubber or elastic bearing can preferably be used to dampen the vibrations between the shaft connected to the inner tube 1 and the component connected to the outer tube 2.

The bearing as shown and described hereinabove can conceivably be used in motor vehicles, more particularly, wheel suspensions, steering linkages, tie rod connections, and the like. Of course, other uses for the bearing in accordance with the present invention are possible and thus the list mentioned immediately above should not be considered exhaustive.

In another preferred embodiment of the present invention FIGS. 2, 4, 6, 8 and 8A can be considered to show a partial cross-sectional end view. The half of the rubber or elastic bearing not depicted in FIGS. 2, 4, 6, 8, and 8A could include a similar configuration of elements for a balanced damping effect between the inner tube 1 and the outer tube 2.

One feature of the invention resides broadly in the hydraulically damping rubber bearing, composed of an inner tube, an outer tube that is placed concentrically or eccentrically apart from it, and a rubber part inserted in between, in which at least one chamber, filled with damping agents, is placed, distinguished in that within the chamber 4 at least one elastic end stop body 5 is provided for, which is placed radially extending between the inner tube 1 and the outer tube 2, and is tightly connected to the inner tube 1 or outer tube 2.

Another feature of the invention resides broadly in the hydraulically damping rubber bearing distinguished in that the end stop body 5 is surrounded with an element 6 which has a greater strength than the end stop body 5 itself.

Yet another feature of the invention resides broadly in the hydraulically damping rubber bearing distinguished in that the element 6 surrounds the sidewalls 7 of the end stop body 5.

Still another feature of the invention resides broadly in the hydraulically damping rubber bearing distinguished in that the element 6 surrounds the sidewalls 7 and the end face 8 of the end stop body 5.

A further feature of the invention resides broadly in the hydraulically damping rubber bearing distinguished in that between the element 6 and the end stop body 5 in the surface of the element 6 and/or the end stop body 5 at least one channel 9 is placed which is connected to the chamber 4.

Another feature of the invention resides broadly in the hydraulically damping rubber bearing distinguished in that between the end face 8 of the element 6 and the area of the inner tube 1 or outer tube 2 that is turned to it, at least one radially or rotatingly extending knob 10 is provided.

Yet another feature of the invention resides broadly in the hydraulically damping rubber bearing distinguished in that between the element 6 and the bottom area 11 at least some parts of the end stop body 5 are exposed.

Still another feature of the invention resides broadly in the hydraulically damping rubber bearing distinguished in that the end stop body 5 fills the element 6 only partially.

A further feature of the invention resides broadly in the hydraulically damping rubber bearing distinguished in that the element 6 is made of a body that is stable in its form.

Examples of hydraulically damping bearings in which the present invention may possibly be utilized or which may possibly be adapted for use in the context of the present invention may be disclosed in the following patents: U.S. Pat. No. 4,893,799 entitled "Vibration Isolation Apparatus"; U.S. Pat. No. 4,953,833 entitled "Hydraulically Damping Elastic Bearing"; U.S. Pat. No. 4,958,811 entitled "Hydraulically Damping Elastic Bearing"; U.S. Pat. No. 4,982,938 entitled "Hydraulically Damping Elastic Bearing"; U.S. Pat. No. 5,048,803 entitled "Hydraulically Damping Bearing"; U.S. Pat. No. 5,080,331 entitled "Elastic Bushing Employing an Inertial Column of Damping Fluid"; U.S. Pat. No. 5,181,698 entitled "Hydraulically Damping Rubber Bearing"; U.S. Pat. No. 5,259,600 entitled "Elastic Construction Device for Motor Vehicle Suspension Systems"; U.S. Pat. No. 5,305,991 entitled "Hydraulically Damped Sleeve Bearing"; and U.S. Pat. No. 5,492,310 entitled "Hydraulically Damping Elastic Bearing".

Examples of rubber or elastic bearings in which the present invention may possibly be utilized or which may possibly be adapted for use in the context of the present invention may be disclosed in the following patents: U.S. Pat. No. 5,340,094 entitled "Hydraulically Damping Elastomeric Bearing"; U.S. Pat. No. 5,340,093 entitled "Hydraulically Damped Rubber Bearing"; U.S. Pat. No. 5,318,283 entitled "Rubber Bearing"; U.S. Pat. No. 5,316,274 entitled "Rubber Bearing that Suppresses Vibrations Hydraulically"; U.S. Pat. No. 5,271,678 entitled "Elastic Bearing"; and U.S. Pat. No. 5,205,545 entitled "Elastic Bearing Allowing Cardanic Movement with Low Restoring Moments".

Examples of vulcanization processes which may possibly be utilized or adapted for use in the context of the present invention may be disclosed in the following patents: U.S. Pat. No. 5,332,787 entitled "Vulcanization Process Using Basic Zinc Carbonate Hydroxide"; U.S. Pat. No. 5,240,669 entitled "Method for Vulcanizing an Elastomeric Product Including Alternate Heating and Pressurizing Steps"; U.S. Pat. No. 5,238,643 entitled "Vulcanization Method for Elastomer Product"; and U.S. Pat. No. 5,210,152 entitled "Process for the Vulcanization of Polychloroprene".

Examples of sealing by means of vulcanization and similar processes which may possibly be utilized or adapted for use in the context of the present invention may be disclosed in the following U.S. Pat. Nos. 5,034,852; 4,943,070; 4,819,953; 4,075,755; and 4,746,130.

Examples of elastomers or elastic materials in which the present invention may be possibly utilized or which may be adapted for use in the context of the present invention may be disclosed in the following U.S. Pat. Nos. 5,473,017; 5,472,782; 5,458,935; 5,451,640; 5,451,439; 5,436,295; 5,436,290; 5,416,146; 5,410,009, 5,397,832; 5,385,775; 5,169,706; 5,116,662; 5,114,781; and 4,981,747.

The components disclosed in the various publications, disclosed or incorporated by reference herein, may be used in the embodiments of the present invention, as well as, equivalents thereof.

All, or substantially all, of the components and methods of the various embodiments may be used with at least one embodiment or all of the embodiments, if more than one embodiment is described herein.

The invention as described hereinabove in the context of the preferred embodiments is not to be taken as limited to all of the provided details thereof, since modifications and variations thereof may be made without departing from the spirit and scope of the invention.

What is claimed is:

1. A motor vehicle hydraulically damping elastic shaft bearing, said hydraulically damping elastic shaft bearing comprising:

a first member;

said first member being cylindrically shaped;

said first member being configured to receive a shaft of a motor vehicle;

a second member;

said second member being configured to mount to a component of a motor vehicle;

said second member being disposed about said first member;

said second member comprising a first surface and a second surface;

said first surface of said second member being disposed to face said first member;

said first surface of said second member being cylindrically shaped;

said second surface of said second member being disposed opposite said first surface;

a third member;

said third member comprising an elastic material;

said elastic third member being disposed between said first member and said second member;

said first member being disposed to be radially displaceable within said second member;

said elastic third member comprising at least one chamber;

said at least one chamber being configured to contain a damping medium;

at least one body being configured and disposed to limit and stop radial movement between said first member and said second member;

said at least one body being rigidly connected to one of said first member and said second member;

said at least one body extending away from said one of said first member and said second member and towards the other of said first member and said second member in a substantially radial direction;

said at least one body being disposed within said at least one chamber;

at least one element being configured to limit radial movement between said first member and said second member;

said at least one element being disposed about said at least one body;

said at least one element having a first rigidity;

said at least one body having a second rigidity; and the first rigidity being substantially greater than the second rigidity.

2. The hydraulically damping elastic shaft bearing according to claim 1, further comprising:

at least one channel;

said at least one channel being disposed between said at least one element and said at least one body; and said at least one channel being configured and disposed to connect to said at least one chamber to permit flow of damping medium into said at least one channel.

3. The hydraulically damping elastic shaft bearing according to claim 2, wherein:

said at least one body comprises a first end and a second end;

said first end of said at least one body is rigidly connected to said one of said first member and said second member;

said second end of said at least one body is disposed opposite said first end;

said at least one body comprises a first portion;

said first portion of said at least one body is disposed between said first end and said second end of said at least one body; and said at least one element is disposed to cover said first portion of said at least one body to limit deformation of said first portion of said at least one body upon the application of stress.

4. The hydraulically damping elastic shaft bearing according to claim 3, wherein:

said at least one body comprises a second portion;

said second portion of said at least one body is disposed between said first portion and said first end of said at least one body; and said second portion of said at least one body being disposed immediately adjacent to said at least one chamber and defining a portion of said at least one chamber.

5. The hydraulically damping elastic shaft bearing according to claim 4, wherein:

said second end comprises an end surface;

said end surface of said second end is disposed to face said first surface of said second member; and said at least one element is configured and disposed to cover said end surface of said second end of said at least one body.

6. The hydraulically damping elastic shaft bearing according to claim 5, wherein:

said first member comprises at least one projection;

said at least one projection of said first member extends a substantial distance toward said second member in a substantially radial direction; and said at least one body is disposed about said at least one projection of said first member.

7. The hydraulically damping elastic shaft bearing according to claim 5, wherein:

said second member is cylindrically shaped;

said second member is disposed substantially concentric to said first member;

said at least one element and said at least one body are configured to form at least one recess between said at least one element and said at least one body;

said at least one element comprises a material resistant to deformation upon the application of stress;

said at least one body is configured to be deformed into said at least one recess upon the application of stress;

said at least one element comprises a surface;

said surface of said at least one element is disposed adjacent to said at least one body;

said at least one body comprises a surface;

said surface of said at least one body is disposed adjacent to said at least one element;

said at least one channel is disposed in at least one of said surface of said at least one element and said surface of said at least one body;

said elastic third member is rigidly connected to at least one of said first member and second member;

said at least one chamber comprises a first chamber and a second chamber; and said elastic third member comprises an arrangement to permit flow of damping medium between said first chamber and said second chamber.

8. The hydraulically damping elastic shaft bearing according to claim 5, further comprising:

at least one fourth member; and said at least one fourth member being disposed between said at least one element and the other of said first member and said second member.

9. The hydraulically damping elastic shaft bearing according to claim 8, wherein:

said second member is cylindrically shaped;

said second member is disposed substantially concentric to said first member;

said at least one element and said at least one body are configured to form at least one recess between said at least one element and said at least one body;

said at least one element comprises a material resistant to deformation upon the application of stress;

said at least one body is configured to be deformed into said at least one recess upon the application of stress;

said at least one element comprises a surface;

said surface of said at least one element is disposed adjacent to said at least one body;

said at least one body comprises a surface;

said surface of said at least one body is disposed adjacent to said at least one element;

said at least one channel is disposed in at least one of said surface of said at least one element and said surface of said at least one body;

said first member defining a longitudinal axis;

said at least one fourth member extends according to one of a) and b):

a) along said at least one element in a direction substantially parallel to the longitudinal axis; and b) along said at least one element in a direction substantially circumferential to the longitudinal axis;

said at least one fourth member is configured to allow flow of damping medium through said at least one fourth member to permit flow of damping medium throughout said at least one chamber;

said at least one fourth member is disposed in contact with said element and the other of said first member and said second member;

said elastic third member is rigidly connected to at least one of said first member and second member;

said at least one chamber comprises a first chamber and a second chamber; and said elastic third member comprises an arrangement to permit flow of damping medium between said first chamber and said second chamber.

10. A motor vehicle hydraulically damping elastic shaft bearing, said hydraulically damping elastic shaft bearing comprising:

a first member;

said first member being cylindrically shaped;

said first member being configured to receive a shaft of a motor vehicle;

a second member;

said second member being configured to mount to a component of a motor vehicle;

said second member being disposed about said first member;

said second member comprising a first surface and a second surface;

said first surface of said second member being disposed to face said first member;

said first surface of said second member being cylindrically shaped;

said second surface of said second member being disposed opposite said first surface;

a third member;

said third member comprising an elastic material;

said elastic third member being disposed between said first member and said second member;

said first member being disposed to be radially displaceable within said second member;

said elastic third member comprising at least one chamber;

said at least one chamber being configured to contain a damping medium;

at least one body being configured and disposed to limit and stop radial movement between said first member and said second member;

said at least one body being rigidly connected to one of said first member and said second member;

said at least one body extending away from said one of said first member and said second member and towards the other of said first member and said second member in a substantially radial direction;

said at least one body being disposed within said at least one chamber;

at least one element being configured to limit radial movement between said first member and said second member;

said at least one element being disposed about said at least one body;

said at least one element having a first durability to repeated impact;

said at least one body having a second durability to repeated impact; and the first durability to repeated impact being substantially greater than the second durability to repeated impact.

11. The hydraulically damping elastic shaft bearing according to claim 10, further comprising:

at least one channel;

said at least one channel being disposed between said at least one element and said at least one body; and said at least one channel being configured and disposed to connect to said at least one chamber to permit flow of damping medium into said at least one channel.

12. The hydraulically damping elastic shaft bearing according to claim 10, wherein:

said at least one body comprises a first end and a second end;

said first end of said at least one body is rigidly connected to said one of said first member and said second member;

said second end of said at least one body is disposed opposite said first end;

said at least one body comprises sidewalls;

said sidewalls of said at least one body are disposed between said first end and said second end of said at least one body;

said second end comprises an end surface;

said end surface of said second end is disposed to face the other of said first member and said second member; and said at least one element is disposed to cover said sidewalls and said end surface of said at least one body to limit deformation of said at least one body upon the application of stress.

13. The hydraulically damping elastic shaft bearing according to claim 12, wherein:

said first member comprises at least one projection;

said at least one projection of said first member extends a substantial distance toward said second member in a substantially radial direction; and said at least one body is disposed about said at least one projection of said first member.

14. The hydraulically damping elastic shaft bearing according to claim 12, wherein:

said second member is cylindrically shaped;

said second member is disposed one of:
 a) substantially concentric to said first member; and
 b) substantially eccentric to said first member;

said at least one element and said at least one body are configured to form at least one recess between said at least one element and said at least one body;

said at least one body is configured to be deformed into said at least one recess upon the application of stress;

said elastic third member is rigidly connected to at least one of said first member and second member;

said at least one chamber comprises a first chamber and a second chamber; and said elastic third member comprises an arrangement to permit flow of damping medium between said first chamber and said second chamber.

15. The hydraulically damping elastic shaft bearing according to claim 12, further comprising:

at least one fourth member;

said at least one fourth member being disposed between said at least one element and the other of said first member and said second member.

16. The hydraulically damping elastic shaft bearing according to claim 15, wherein:

said second member is cylindrically shaped;

said second member is disposed substantially concentric to said first member;

said at least one element comprises a surface;

said surface of said at least one element is disposed adjacent to said at least one body;

said at least one body comprises a surface;

said surface of said at least one body is disposed adjacent to said at least one element;

said at least one channel is disposed in at least one of said surface of said at least one element and said surface of said at least one body;

said first member defining a longitudinal axis;

said at least one fourth member extends according to one of a) and b):
 a) along said at least one element in a direction substantially parallel to the longitudinal axis; and
 b) along said at least one element in a direction substantially circumferential to the longitudinal axis;

said at least one fourth member is configured to allow flow of damping medium through said at least one fourth member to permit flow of damping medium throughout said at least one chamber; and said at least one fourth member is disposed in contact with said element and the other of said first member and said second member.

* * * * *

UNITED STATES PATENT AND TRADEMARK OFFICE
CERTIFICATE OF CORRECTION

PATENT NO.   :   5,918,864
DATED        :   July 6, 1999
INVENTOR(S)  :   Christof SCHÄFER It is certified that error appears in the above-indentified patent and that said Letters Patent is hereby corrected as shown below:

On the title page, after item [76] section, insert the following:

--[73] Assignee: Boge GmbH, Bonn, Germany--.

On the title page, column 2, after 'Attorney, Agent, or Firm-', delete "Niles" and insert --Nils--.

In column 5, line 24, after 'or', delete "8A)" and insert --8A)--.

Signed and Sealed this

Fifth Day of September, 2000

Attest:

Q. TODD DICKINSON

Attesting Officer

Director of Patents and Trademarks

UNITED STATES PATENT AND TRADEMARK OFFICE
CERTIFICATE OF CORRECTION

PATENT NO.   :   5,918,864
DATED        :   July 6, 1999
INVENTOR(S)  :   Christof SCHÄFER It is certified that error appears in the above-indentified patent and that said Letters Patent is hereby corrected as shown below:

On the title page, after item [76] section, insert the following:

--[73] Assignee:   Roge GmbH, Bonn, Germany--.

Signed and Sealed this

Twentieth Day of February, 2001

Attest:

NICHOLAS P. GODICI

Attesting Officer    Acting Director of the United States Patent and Trademark Office